United States Patent [19]
Rieger et al.

[11] Patent Number: 4,995,694
[45] Date of Patent: Feb. 26, 1991

[54] FIBER OPTICAL BEAM SPLITTING DEVICE

[75] Inventors: Robert Rieger, Ostermüchen; Bodo Tilly, Grafing, both of Fed. Rep. of Germany

[73] Assignee: Messerschmitt-Bolkow-Blohm GmbH, Fed. Rep. of Germany

[21] Appl. No.: 494,630

[22] Filed: Mar. 16, 1990

[30] Foreign Application Priority Data

Mar. 16, 1989 [DE] Fed. Rep. of Germany ....... 3908530

[51] Int. Cl.⁵ .............................................. G02B 6/34
[52] U.S. Cl. ................................ 350/96.19; 350/96.20
[58] Field of Search ............... 350/96.10, 96.15, 96.18, 350/96.19, 96.20; 372/41, 66

[56] References Cited

U.S. PATENT DOCUMENTS

| | | | |
|---|---|---|---|
| 3,505,613 | 4/1970 | Campbell et al. | 372/41 |
| 3,508,165 | 4/1970 | Nicolai | 372/41 |
| 4,413,879 | 11/1983 | Berthold, III et al. | 350/96.19 |
| 4,482,994 | 11/1984 | Ishikawa | 370/3 |
| 4,812,005 | 3/1989 | Heywang | 350/96.20 |
| 4,883,333 | 11/1989 | Yanez | 350/96.10 |

FOREIGN PATENT DOCUMENTS

| | | | |
|---|---|---|---|
| 2938649 | 4/1980 | Fed. Rep. of Germany | 350/96.15 |
| 2929186 | 2/1981 | Fed. Rep. of Germany | 350/96.19 |

*Primary Examiner*—Frank Gonzalez
*Attorney, Agent, or Firm*—Evenson, Wands, Edwards, Lenahan & McKeown

[57] ABSTRACT

A fiber-optical beam splitting device is disclosed which has a prismatically constructed front face and is used for the coupling-in and coupling-out of light into or from an optical fiber from or into different directions fo the environment of the optical fiber.

8 Claims, 3 Drawing Sheets

FIBER OPTICAL BEAM SPLITTING DEVICE

BACKGROUND AND SUMMARY OF THE INVENTION

The invention relates to a fiber-optical beam splitting device for the coupling in or out of light into or out of an optical fiber from or into different directions of the environment of the optical fiber.

For the branching of light guided in an optical fiber or for coupling light from different directions into the optical fiber, different measures are known, such as fusion couplers or the use of partially reflecting mirrors which all have the disadvantage that, in comparison to the fiber diameter, they take up a relatively large volume and require relatively expensive manufacturing methods.

It is therefore an object of the invention to provide a fiber-optical beam splitting device which has a very compact and simple construction and the splitting relationship of which can be adjusted. This object is achieved according to preferred embodiments of the invention by a beam splitting device for the coupling in or out of light into or out of an optical fiber from or into different directions of the environment of the optical fiber, characterized in that at least one front face of the optical fiber is constructed in the shape of a prism, the angle Y between the longitudinal axis of the fiber and a surface of the prism following the condition wherein $$\frac{1}{3}\left(180° - \arcsin\frac{n_2}{n_1} - \arcsin\frac{n_3}{n_1}\right) \leq \gamma \leq \arcsin\frac{n_2}{n_1} - \arcsin\frac{n_3}{n_1}$$

in which equation
- $n_1$ = the refraction index of the fiber core,
- $n_2$ = the refraction index of the fiber sheath,
- $n_3$ = the refraction index of the medium surrounding the optical fiber.

Although light wave wave guides with sloping front faces are known per se (for example, German Published Examined patent application DE-AS 21 31 500), such measures are used only for changing the aperture angle. In contrast, the device according to the invention provides a fiber-optical beam splitting device which either radiates the light emerging from the fiber in different directions of the environment or can receive light from these directions. In order to make this possible, the angle between the longitudinal axis of the fiber and a surface of the end face of the optical fiber, which may be ground, for example, in the shape of a ridge prism, must not fall below certain limits or exceed certain limits. If this angle $\gamma$ assumes the value indicated by the equation $$\frac{\sin\gamma}{\sin|90° - 3\gamma|} = n_1$$

a T-shaped branching with right angles between the individual beaming direction is even possible which allows a particularly simple construction of this type of a beam splitting device.

The beam splitting device may be used for various purposes, in which case particularly the uses in an opto-electrical transmitting and receiving device or as a fiberoptical coupler are very advantageous.

Basically, the invention is not restricted to front faces of the optical fiber constructed with two surfaces, so that a splitting into more than only two beam directions is possible.

Other objects, advantages and novel features of the present invention will become apparent from the following detailed description of the invention when considered in conjunction with the accompanying drawings.

DETAILED DESCRIPTION OF THE DRAWING

Figure 1:
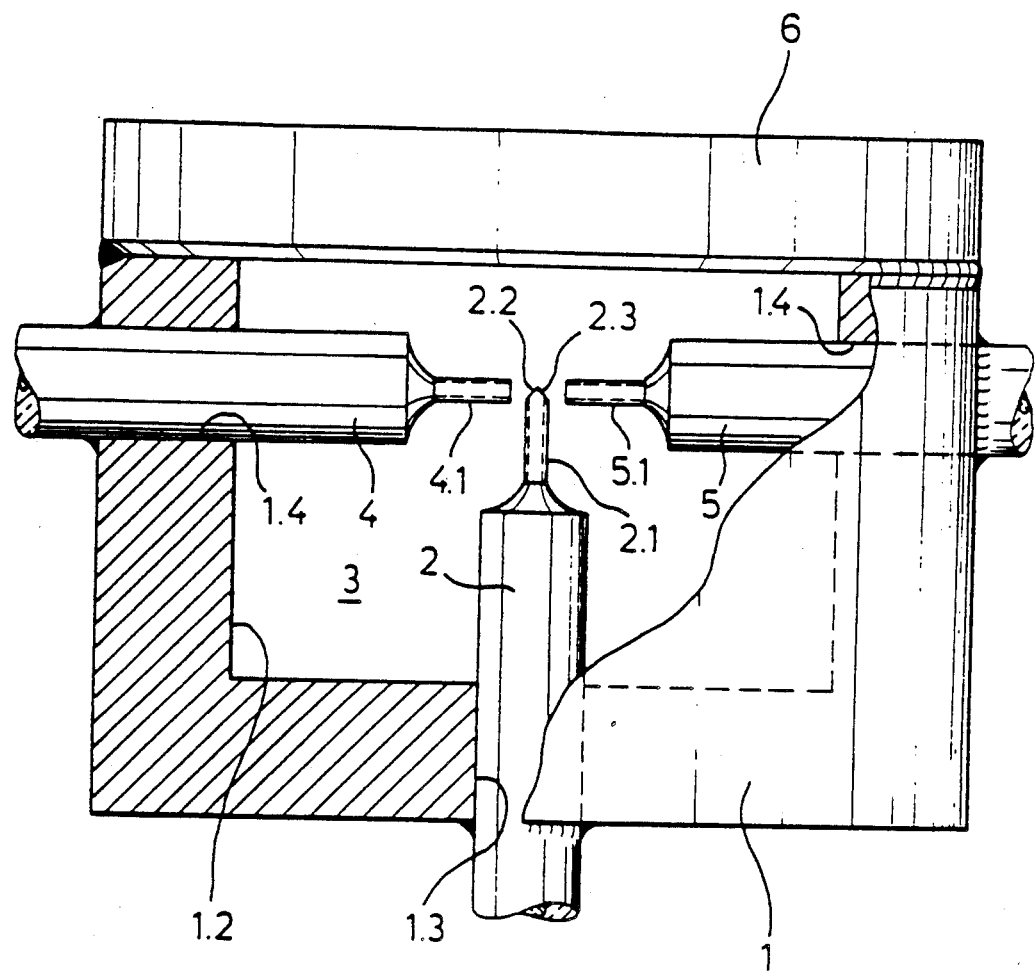
FIG. 1 is a schematic view of a fiber-optical beam splitting device inside a fiber coupler, constructed according to a preferred embodiment of the invention.

In the embodiment shown in FIG. 1, inside a cylindrical housing 1 which may be manufactured, for example, from a round rod having a pocket bore 1.2, a fiber-optical light guide 2 is guided through a bore 1.3 which is coaxially smaller than the pocket bore 1.2 and is fixed in the bore 1.3. The coating is removed at the end of the light guide 2 so that the bare optical fiber 2.1 projects into the interior 3 of the housing 1. The front face end of the optical fiber 2.1 is ground symmetrically with respect to the longitudinal axis in the shape of a ridge prism and thus has two front faces 2.2 and 2.3.

At a right angle to the light guide, another bore 1.4 extends through the housing in such a manner that the axes of the bores 1.3 and 1.4 intersect with one another in a point. Through this bore 1.4, an end of additional light guides 4 and 5 is inserted from both sides and connected with the housing wall. The ends of the oPtical fiber 4.1 and 5.1, from which the coating is also removed, extend as closely as possible to the intersecting point of the bores 1.3 and 1.4 and are therefore located as closely as possible opposite the front faces 2.2 and 2.3.

After the mounting, the housing 1 is hermetically sealed off by means of a cylindrical cover 6, in which case, prior to that, the interior 3 is rinsed by a dried and purified inert gas.

Figure 2:
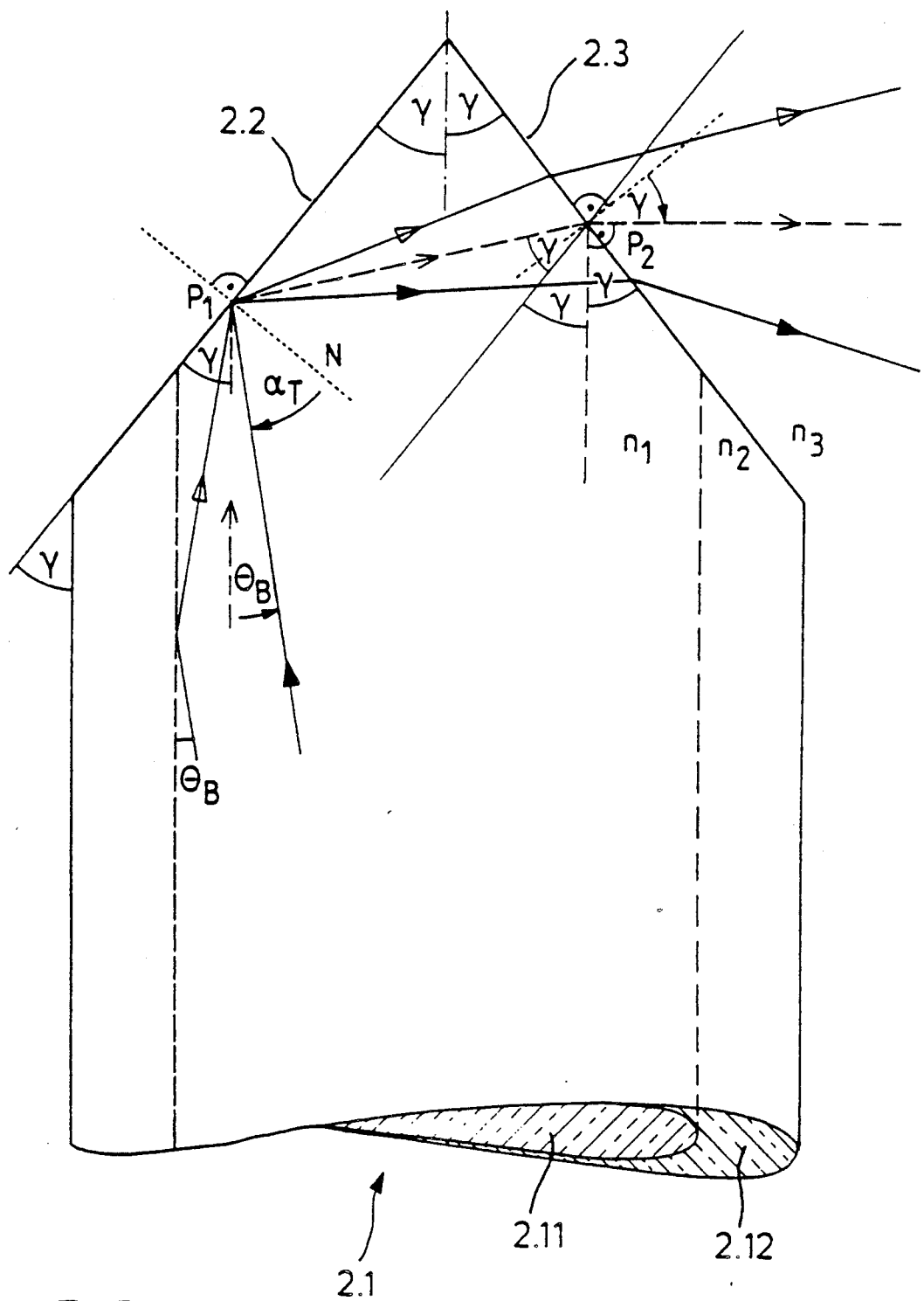
FIG. 2 is a detailed schematic enlarged view of the front faces of a fiber-optical beam splitting device, constructed according to a preferred embodiment of the invention.

The operation of the coupler shown in FIG. 1 will now be explained by means of FIG. 2. In FIG. 2, the tip of the optical fiber 2.1 is shown which, in the shown embodiment, is to be a step-index thick core fiber. It consists of a core 2.11 and a cladding 2.12 with the refraction index $n_1$ bzw. $n_2$. In this case, the co diameter typically is 200 μm, and the outer diameter of the sheath 2.12 is approximately 280 μm. The refraction indices $n_1$ und $n_2$ of the core 2.11 and of the cladding 2.12 typically amount to:
$n_1 = 1.575$
$n_2 = 1.558$
When air is used as the ambient medium, its refraction index $n_3$ may be assumed to be 1.

The front face of the optical fiber 1 is ground symmetrically in the shape of a ridge prism, the groundangle $\gamma$, with respect to the longitudinal axis of the fiber, being identical for both surfaces 2.2 and 2.3. When optical fibers made of synthetic material are used, the shaping of the front side of the optical fiber into a prism may also be produced by a pressing operation.

The light guided in the optical fiber 2.1, with respect to its "acceptance angle" $\theta_B$ inside the fiber core must now meet the condition $$\sin(90° - \theta_B) = \frac{n_2}{n_1} \qquad (1)$$

or converted $$\theta = 90° - \arcsin\frac{n_2}{n_1} \qquad (2)$$

The term "acceptance angle" is in quotation marks in order to differentiate it from the acceptance angle which is normally used for coupling light into the fiber. With the above-mentioned values for $n_1$ und $n_2$, the "acceptance angle" is $\theta_B = 8.4°$ which therefore must not be exceeded by a light beam inside the fiber so that a transmission is possible.

When such a light beam with the limit angle $\theta_B$ impinges, for example, on the surface 2.2, it is to be reflected and be able to emerge through the opposite surface 2.3. So that this occurs, the condition for total reflection must be maintained at the surface 2.2. The limit angle $\alpha_T$ for the total reflection is obtained from $$\sin\alpha_T = \frac{n_3}{n_1} \qquad (3)$$

or converted $$\alpha = \arcsin\frac{n_3}{n_1}. \qquad (4)$$

By means of the above-mentioned values for $n_1$ und $n_3$, a limit angle of $\alpha_T = 39.4°$ for the total reflection is obtained.

The angles $\theta_B$ und $\alpha_T$ therefore provide the limits for the ground angle $\gamma$. The following is true for the upper limit $\gamma_{max}$:

$$\gamma_{max} = 90° - \theta_B - \alpha_T \qquad (5)$$

or $$\gamma_{max} = \arcsin\frac{n_2}{n_1} - \arcsin\frac{n_3}{n_1}. \qquad (6)$$

Following is the procedure for determining the lower boundary of the ground angle $\gamma_{min}$.

Starting from a light beam extending in parallel with respect to the fiber axis which in point $P_1$ was reflected at the surface 2.2, this reflected beam forms an angle $3\gamma$ at the surface 2.3. A beam which deviates from the longitudinal fiber axis by the "acceptance angle" $\theta_B$ will then therefore form an angle $3\gamma - \theta_B$ together with the limit surface 2.3. In a limit case, the difference of this angle with respect to the limit angle $\alpha_T$ for the total reflection forms a right angle with respect to the normal line N of the surface 2.2. Thus:

$$90° = (3\gamma_{min} - \theta_B) + \alpha_T \qquad (7)$$

or $$\gamma_{min} = \tfrac{1}{3}(\theta_B - \alpha_T + 90°). \qquad (8)$$

When equations (2) and (4) are used, the following is therefore obtained:

$$\gamma_{min} = \frac{1}{3}\left(180 - \arcsin\frac{n_2}{n_1} - \arcsin\frac{n_3}{n_1}\right). \qquad (9)$$

With the described refraction indices $n_1$ and $n_2$ the upper and lower limit of the ground angle $\gamma$ will be:

$$9.7° \leq \gamma \leq 42.2°$$

That ground angle $\gamma$ is particularly interesting because it can be easily implemented in which the light emerging from the light guide forms an angle of 90° with respect to the longitudinal fiber axis.

When the beam path and its refraction in Point $P_2$ is taken into account, the following is obtained:

$$n_3 \cdot \sin\gamma = n_1 \cdot \sin|90° - 3\gamma| \qquad (10).$$

For the case $n_3 = 1$ (air), the following transcendental function is obtained $$\frac{\sin\gamma}{\sin|90° - 3\gamma|} = n_1. \qquad (11)$$

This function can be reduced to the basic form $$y = \frac{\sin x}{x}$$

which can be solved by means of methods of approximation. For the above-mentioned value of the refraction index $n_1$ of the core material, a ground angle $\gamma = 39.6°$ is therefore obtained. In the case of this ground angle, a beam direction of the light emerging from the light guide which is vertical to the fiber axis is possible as well as a coupling into the optical fiber from two beam directions extending at a right angle to the longitudinal axis of the fiber. This means that, in the embodiment shown in FIG. 1, light may move from the light guide 2 into the light guides 4 and 5 as well as in reversed direction.

The splitting of the beam intensities is a function of the adjustment of the optical axes of the light guides 4 and 5 with respect to the surfaces 2.2 and 2.3 as well as of the distance between the surfaces 2.2 and 2.3 from the respective opposite front faces of the fibers 4.1 and 5.1.

Although, in FIG. 1, the absolute measurements of the light guides and of the housing are considerably enlarged in comparison to the original measurements, the mutual relationships are approximately correct. This means that, in the case of the above-mentioned fiber diameter of approximately 280 μm, the housing dimensions should have a diameter of approximately 4 mm and a height of approximately 2.5 mm.

Figure 3:
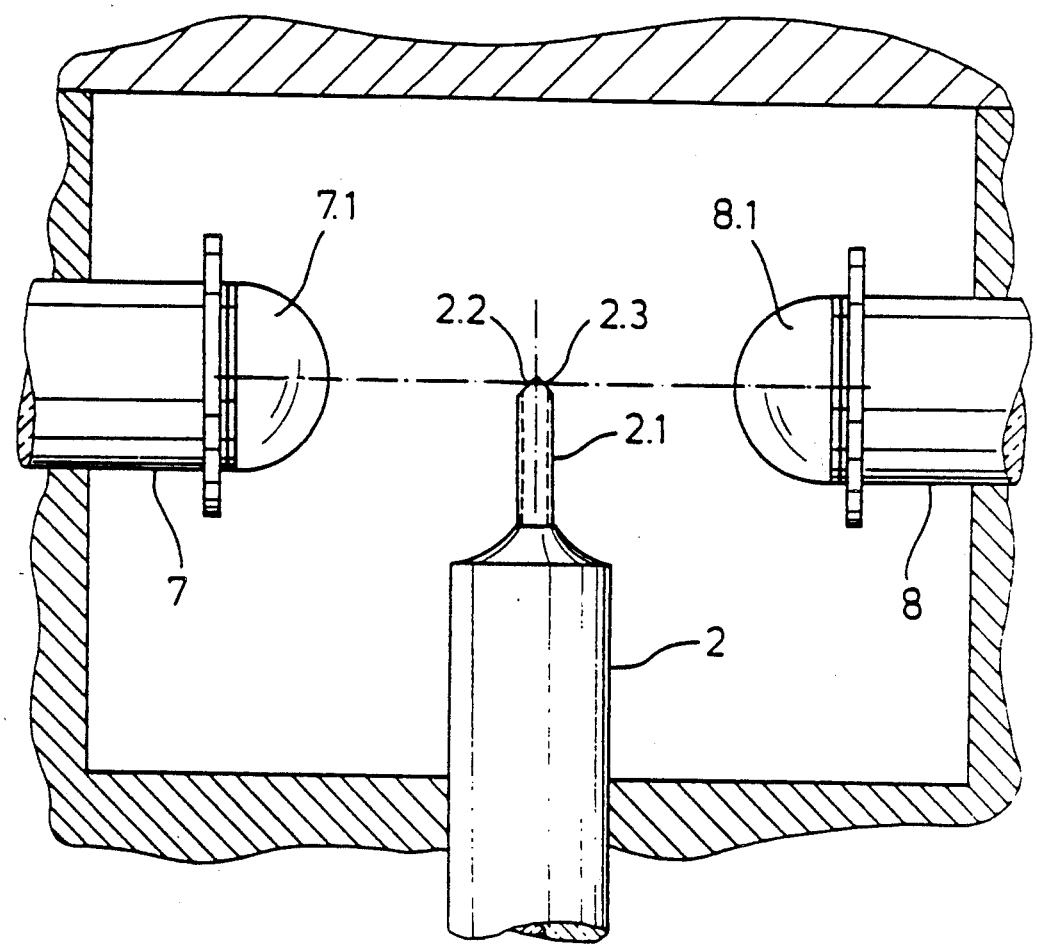
FIG. 3 is a schematic view of a fiber-optical beam splitting device inside a transmitting and receiving device, constructed according to another preferred embodiment of the invention.

In the embodiment shown in FIG. 3, in a housing which is similar to the housing in FIG. 1 and is therefore not shown, a light-emitting diode 7 as well as a photo diode 8 is placed, at a right angle with respect to the longitudinal axis of the fiber, opposite the light guide 2 with the optical fiber 2.1 ground in the shape of a ridge prism. The light-emitting diode 7 and the photo diode 8 each have lenses 7.1 and 8.1 and, with respect to their distance to the corresponding surfaces 2.2 and 2.3 of the optical fiber 2.1, are arranged such that the light-emitting surface or the photosensitive surface are imaged on these surfaces 2.2 and 2.3

The shown device may therefore be used as an optoelectrical transmitting and receiving device, in which case, only one optical fiber is required for the signal transport because this optical fiber, corresponding to the preceding embodiment, is constructed as a beam splitting device.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A fiber-optical beam splitting device for the coupling in or out of light into or out of an optical fiber from or into different directions of the environment of the optical fiber, wherein at least one front face of the optical fiber is constructed in the shape of a prism, the angle Y between the longitudinal axis of the fiber and a surface of the prism following the condition $$\frac{1}{3}\left(180° - \arcsin\frac{n_2}{n_1} - \arcsin\frac{n_3}{n_1}\right) \leq \gamma \leq \arcsin\frac{n_2}{n_1} - \arcsin\frac{n_3}{n_1}$$

wherein
 $n_1$ = the refraction index of the fiber core,
 $n_2$ = the refraction index of the fiber cladding,
 $n_3$ = the refraction index of the medium surrounding the optical fiber.

2. A fiber-optical beam splitting device according to claim 1, wherein the angle $\gamma$ meets the condition $$\frac{\sin\gamma}{\sin|90° - 3\gamma|} = n_1.$$

3. A beam splitting device according to claim 1, wherein the front face of the optical fiber is constructed in the form of a ridge prism, the normal surface line (N) of the ridge prism surfaces and the longitudinal axis of the fiber being coplanar, and the angles $\gamma$ of the individual surfaces of the ridge prism being identical.

4. A fiber-optical beam splitting device according to claim 2, wherein the front face of the optical fiber is constructed in the form of a ridge prism, the normal surface line (N) of the ridge prism surfaces and the longitudinal axis of the fiber being coplanar, and the angles $\gamma$ of the individual surfaces of the ridge prism being identical.

5. A fiber-optical coupler having a beam splitting device according to claim 1, wherein the front face of an optical fiber is, in each case, arranged in the beaming directions of the beam splitting device.

6. A fiber-optical beam splitting device according to claim 2, wherein the front face of the optical fiber is constructed in the form of a ridge prism, the normal surface line (N) of the ridge prism surfaces and the longitudinal axis of the fiber being coplanar, and the angles $\gamma$ of the individual surfaces of the ridge prism being identical.

7. A fiber-optical coupler having a beam splitting device according to claim 3, wherein the front face of the optical fiber is constructed in the form of a ridge prism, the normal surface line (N) of the ridge prism surfaces and the longitudinal axis of the fiber being coplanar, and the angles $\gamma$ of the individual surfaces of the ridge prism being identical.

8. An optoelectrical transmitting and receiving device for the coupling in or out of light into or out of an optical fiber from or into different directions of the environment of the optical fiber, wherein at least one front face of the optical fiber is constructed in the shape of a prism, the angle $\gamma$ between the longitudinal axis of the fiber and a surface of the prism following the condition $$\frac{1}{3}\left(180° - \arcsin\frac{n_2}{n_1} - \arcsin\frac{n_3}{n_1}\right) \leq \gamma \leq \arcsin\frac{n_2}{n_1} - \arcsin\frac{n_3}{n_1}$$

wherein
 $n_1$ = the refraction index of the fiber core,
 $n_2$ = the refraction index of the fiber sheath,
 $n_3$ = the refraction index of the medium surrounding the optical fiber, and
wherein a light-emitting diode or a photo diode is arranged in at least one beaming direction of the prism.

* * * * *